March 15, 1932. H. HUEBER 1,849,327
WINDSHIELD CLEANER MOTOR VALVE ACTION
Filed Feb. 18, 1928
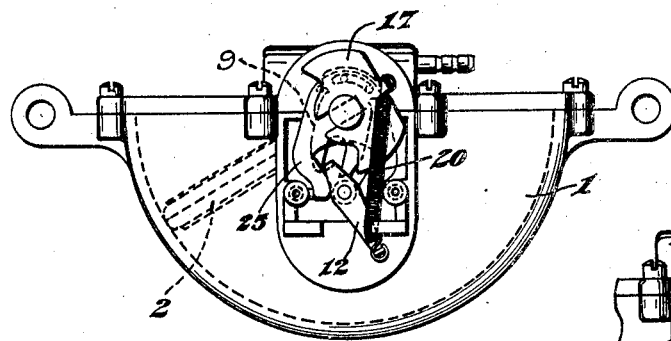
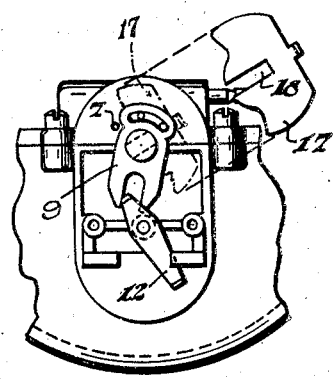
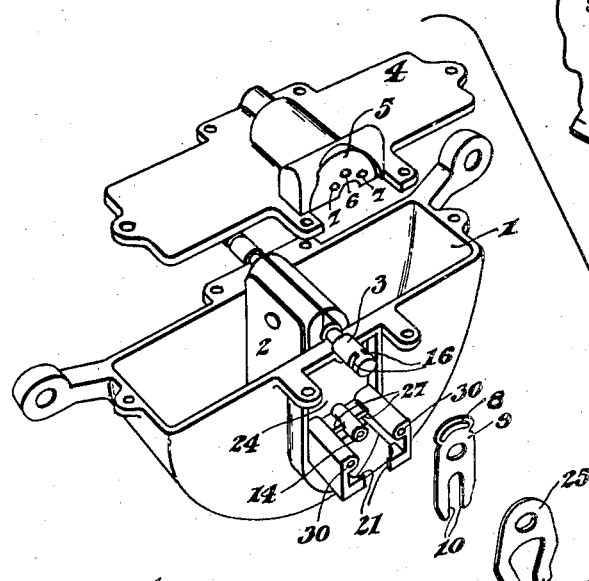
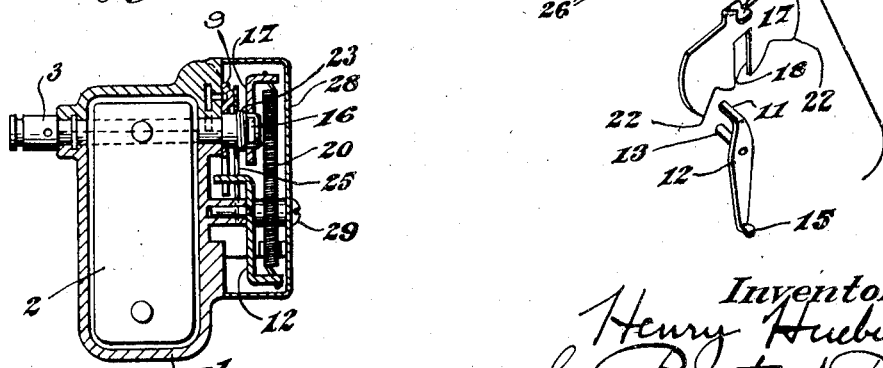

Patented Mar. 15, 1932

1,849,327

UNITED STATES PATENT OFFICE

HENRY HUEBER, OF BUFFALO, NEW YORK, ASSIGNOR TO TRICO PRODUCTS CORPORATION, OF BUFFALO, NEW YORK

WINDSHIELD CLEANER MOTOR VALVE ACTION

Application filed February 18, 1928. Serial No. 255,488.

This invention relates to windshield cleaners of the automatic or power operated type and primarily to the actuating mechanism for shifting the application of power in effecting the desired reciprocatory motion of the windshield cleaner motor.

In the so-called suction-operated windshield cleaner, the motor thereof is operated by a variable source of power which source is usually the intake manifold of the motor vehicle internal combustion engine. At times the degree of suction prevailing within the intake manifold is below an efficient normal. At such times it obviously is important to have as small a load on the windshield cleaner as is possible so that the sub-normal degree of suction will suffice to continue the operation of the windshield cleaner as near to the efficient normal as is possible. In addition to the resistance created by the drag of the wiper over the windshield glass, the snap action of the valve mechanism also requires more or less power to effect the final throw or snap movement to accomplish the desired reversal of power application.

The primary object of the present invention is to provide an improved valve snap action which will operate on a minimum application of power and which will be of simple design and construction. A further object of the invention is to provide a valve mechanism of the snap-over character involving a compound movement or action in which the final portion of the compound movement will be supplemented by a positive force applied to the shiftable valve. A still further object of the invention is to provide a simplified valve action which may readily be assembled and disassembled in an expeditious manner and without the use of tools or special equipment.

The invention will further be found to reside in the salient features of construction and their arrangements and combinations as hereinafter more fully set forth and defined in the appended claims, reference being made to the accompanying drawings wherein, Fig. 1 is an elevation of a suction-operated windshield cleaner motor of the vane-piston type, with the cover to the valve chamber removed, Fig. 2 is a disassembled perspective view depicting the parts of the valve mechanism demounted in their order, Fig. 3 is a fragmentary elevation similar to Fig. 1 but having portions of the valve mechanism removed and showing the actuator laterally removed from its rock shaft ready for placement thereon, and Fig. 4 is a transverse sectional view through the windshield cleaner motor.

The motor of a suction-operated windshield cleaner embodies a casing or chamber, a piston mounted therein for movement back and forth, and an automatic or snap action valve mechanism for alternately connecting the chamber at opposite sides of the piston to a source of suction and establishing atmospheric communication with the chamber at the side of the piston opposite to that which is connected to the source of suction. For the purposes of illustration, the windshield cleaner motor herein shown is of the vane-piston type and comprises a substantially semi-circular casing or chamber 1 having a vane-piston 2 operable therein and supported by a rock shaft 3 which is journalled in bearings concentric to the piston chamber. The diametral side of the casing, herein shown as constituting the top thereof, is closed by a cover 4 which is provided with a valve seat 5 having a suction port 6 interposed between two chamber ports 7 which latter respectively communicate with the piston chamber 1 at opposite sides of the piston 2. These ports are shown as being arranged concentrically about the rock shaft 3 and the suction port 6 is adapted to be brought into communication alternately with the chamber port 7 by a recess 8 in the seat-engaging face of the valve 9. This valve is pivotal on the rock shaft 3 for shifting its recessed portion 8 back and forth over the valve seat 5. The valve is provided with spaced shoulders 10 with which is engageable a lug part 11 of a kicker member 12, the latter being in the form of a simple lever and provided intermediate its ends with a pivot pin 13 for journalling in a bearing 14 provided in the valve chamber of the motor. The lug 11 is herein shown formed by turning downwardly or inwardly the shorter end of the lever-like kicker 12 while the opposite or longer end is turned upwardly or outwardly to form a spring anchor 15. The kicker lug 11 is of smaller transverse dimension than the space between the shoulders 10 so that said lug will have a preliminary play or idle movement before engaging either of the shoulders when effecting a valve-shifting movement. This is shown more clearly in Fig. 3 from which it will be noted that in order to move the valve in a counter-clockwise direction about the shaft 3 that the lug 11 will have to move in a clockwise direction for a short interval before said lug will come into contact with the right-hand shoulder 10 of the valve member.

The end portion of the shaft 3 which protrudes into the valve chamber beyond the valve 9 is provided with a pair of opposed, peripheral slots or keyways having their bottoms substantially parallel, as indicated at 16, and a key-like member 17 having a slot 18 therein of a width substantially equal to the distance between the bottoms of the slots 16 is adapted to be slid transversely of the rock shaft 3 in straddling relation to the slotted portion of the shaft, the parallel walls of the slot 18 slidably engaging the bottoms of the slots. This construction exemplifies the preferred manner of detachably connecting the member 17 to the shaft for movement therewith. This key-like member, hereinafter termed "actuator", is, therefore, slid transversely or radially of the rock shaft for the purposes of mounting and demounting the same. In Fig. 3 the actuator is shown displaced from the shaft in a position for being moved downwardly thereover so as to interlock therewith for simultaneous movement with said power-driven member herein shown as a rock shaft. Overhanging the shaft and carried by the actuator is a spring anchor 19 over which the upper end of a spring 20 is hooked, the lower terminal of the spring being hooked or engaged about the spring anchor 15 of the kicker member. Upon rocking the actuator, as when the piston 2 moves from one limit of movement to the other, the spring 20 will be moved across a dead center position, or to the opposite side of the pivotal axis of the kicker 12 whereupon the latter will snap to effect a shift of the valve.

The final portion of the snap motion is dampened or cushioned by the respective one of the spaced shoulders 21 with which contacts the body of the spring 20, as is shown in Fig. 1. These shoulders incline inwardly so that the engagement of the spring, depicted as a coiled spring, therewith tends to effect an inward deflection of the spring which results in holding the kicker in its otherwise free mounting. These shoulders overhang the kicker so as to prevent its engagement therewith. This cushioning effect tends to dampen the noise incidental to the snap movement and also lessens the jarring of the parts of the mechanism.

The arrangement of the parts is such that the spring 20 is not moved entirely across the pivotal axis of the kicker by the sole movement of the actuator; an additional movement being required to position the spring in a valve-snapping position. This is accomplished by the follow-through movement of the respective one of a pair of cam shoulders 22 on the actuator which are designed to travel arcuate paths into which the kicker extends. The follow-through movement of either cam shoulder 22 will engage the upper end of the kicker and initiate an idle movement thereof relative to the valve. This movement of the kicker is obviously slow, and such slow movement has no effect on the valve, but it does shift the lower or opposite end of the spring, which is connected to the longer arm of the lever-like kicker member, across the pivotal axis of the same whereupon the spring will contract to quickly shift the valve to its new position. The leverage provided in this particular kicker mounting is such that a very small degree of movement of the cam shoulder 22 will be multiplied or enlarged in its resultant movement of the spring anchor 15 so that the cam-imparted movement of the kicker will expedite the movement of the spring to a valve-snapping position.

A coil spring 23 is preferably provided for holding the valve on its seat, the same being interposed between the valve and the actuator member. The bottom of the valve chamber is shown recessed, as indicated at 24, to provide for the movement of the kicker lug 11. This construction disposes the depending portion of the valve in an overhanging position relatively to the recess 24 and in order to maintain the valve flat on its seat and to avoid against the valve tilting or canting to a position which might provide a leakage therebeneath, a pressure-equalizing plate 25 is hung on the power-driven member or shaft 3 and interposed between the spring 23 and the valve, said plate engaging the recessed portion 8 of the valve, firmly holding the same on the seat 5. The plate is provided with downwardly extending leg portions 26 which find rest on the supports 27 at opposite sides of the bearing 14. These supports hold the equalizing plate in substantially parallelism to the valve seat 5, and the spring 23 bearing on the plate has its spring pressure transmitted to the recessed portion of the valve whereby a firm seating relation with its seat is obtained.

The valve mechanism is enclosed within a cover plate 28 the same being secured in position by suitable means as screws 29 threading into the standards 30.

In operation, the actuator by its back and forth movement carries the upper end of the spring across the pivotal axis of the rock shaft 3 and to a position approaching a dead center relation with respect to the pivotal axis 13 of the kicker. As the spring 20 approaches such dead center relation the kicker-shifting cam 22 engages the kicker and initiates a movement of the lower end of the spring 20. It will be noted that this movement imparted to the lower end of the spring occurs when the movement of the upper end of the spring is drawing to a close or is being retarded by reason of the fact that the anchor part 19 is descending in an arcuate path toward the kicker as distinguished from the upper transverse arcuate movement which carries the upper end of the spring through its major portion of movement. Then too, the lower end of the spring 20, or that portion which extends below the kicker pivot 13, is relatively short as compared to that portion which extends thereabove so that any bodily movement of said lower end will necessarily be of short duration in order to shift the longitudinal axis of the spring to the opposite side of said kicker pivot. After the camming shoulder 22 comes into engagement with the kicker, the initial movement imparted to the latter will be independent of any movement transmitted to the valve until the spring 20 has been shifted to the opposite side of the pivotal axis of the kicker whereupon the spring will impart a quick, accelerated movement to the lug 11 and bring it into engagement with the forward shoulder 10 and carrying the same to effect a desired change of position of the valve. Should the valve fail to respond to the resilient efforts of the spring 20, for any reason, the succeeding cam shoulder 22 will follow through with the lug 11 and positively move the same against the forward shoulder 10 and positively shift the valve free of any accidental sticking.

The assembly of the snap mechanism is of a simple construction and may readily be disassembled or assembled without special equipment. In assembling the mechanism the valve 9 is first placed over the shaft 3, the spring means 25 and 23 are next arranged on the valve; the actuator is keyed onto the shaft while the kicker is dropped into its bearing 14. This arrangement of parts is maintained by the coil spring 20 being hooked over the anchors 15 and 19, the spring tending to urge the actuator against accidental displacement from the power-driven shaft 3, and the cooperation of the shoulders 21 with the spring 20 urges the kicker against such accidental displacement. The valve mechanism is more silent in its action by reason of the cushioning action of the spring 20 against the shoulders 21. The compound movement required to place the spring in a valve-throwing position reduces the power or force required to move the spring across dead center, and during this compound movement there is the follow-through camming action of the actuator shoulder against the kicker. The spring movement is multiplied by the longer arm of the kicker, and only a slight touch of the camming shoulder against said kicker is required to move the spring across a dead center position so as to effect a throw of the valve. Should the valve stick for any reason, such as under a high vacuum which would tend to hold the valve very firmly on its seat, such condition would be overcome by the camming shoulder which would follow through and carry the kicker lug 11 into a direct and positive engagement with the forward shoulder 10 of the valve regardless of the spring 20, thereby loosening the sticking valve and permitting the spring 20 to then complete the valve shifting movement. The spring 20 not only effects a shift of the valve but also exerts a downward pull on the anchor 19 which will tend to assist in holding the wiper (not shown) in an elevated or parked position and avoid any creeping of the wiper into the field of vision of the operator of the automobile. As an aid to the motor in urging the windshield wiper to its limits of movement, it will be noted that the spring 20 crosses the pivotal axis of the rock shaft 3 preliminary to any movement of the kicker whatsoever, and that after crossing said pivotal axis, from thereon the tendency of the spring 20 will be to accelerate the movement of the rock shaft in the direction it is rocking. Therefore, this spring action will occur at a point in the cycle of operation where it will assist the following cam shoulder 22 in its kicker-shifting operation, and after the spring has crossed the pivotal axis 13 the contraction of the spring will tend not only to lift the wiper to its limit of movement, but will also exert a lifting force on the spring-anchored end of the spring anchor 15 of the kicker.

The actuator is secured against accidental displacement by the pull exerted thereon by the spring 20 and to remove the actuator the spring may be disconnected first or the actuator may be removed against the tension of the spring by applying a radial lifting force thereto, sliding the actuator out from the shaft to disrupt the interlock therewith. This construction is, therefore, readily and easily repairable and does not require any special skill or equipment in making the necessary repair.

What is claimed is:

1. A valve snap action comprising a pivotal valve having spaced shoulders, a pivoted kicker having a part arranged between said shoulders for limited play movement to engage the shoulders successively for effecting a shift of the valve, an actuator rockable on an axis off center relative to the pivotal axis of the kicker, a spring connecting the actuator to the kicker and movable by said actuator across the pivotal axis of the kicker for effecting a valve shifting movement of the latter, and limit shoulders arranged in the path of the spring for engagement therewith to limit the movement of the kicker.

2. A valve snap action comprising a pivotal valve, a pivoted kicker having a lug engaging the valve for effecting a shift of the valve, a rockable actuator, a coiled spring connecting the actuator to the kicker and movable by said actuator across the pivotal axis of the kicker for effecting a valve shifting movement of the latter, and limit shoulders arranged in the path of the spring for engaging the same to limit the movement of the kicker, said actuator having a part directly engageable with the lug to positively move the kicker through the lug subsequent to an initial movement of the spring.

3. A valve snap action comprising a valve seat, a valve shiftable back and forth thereon, a kicker having a play connection with the valve for shifting the same on its seat, a power driven member, an actuator carried by said member and having a part slidable into interlocking relation with the power member in a direction toward said kicker for connecting the actuator to the said member against relative rotation, said actuator being displaceable therefrom in a direction away from said kicker, and a spring connecting the kicker to the actuator and movable by the latter under tension to opposite sides of the kicker for snapping the same to shift the valve, said spring also acting to hold the actuator on the power driven member against displacement.

4. A valve mechanism for motors comprising a valve seat, a rock shaft journalled adjacent said seat, an open pivot bearing, a valve engaged on said seat, a kicker having a pintle removably journalled in said bearing and extending parallel to said rock shaft, said kicker being movable to shift the valve on its seat, an actuator movable with the rock shaft, a spring device interposed between the kicker and actuator and positionable by the latter from one to the other of two operative positions for imparting a valve-shifting movement to the kicker, and means guiding the terminal movements of said spring device and serving therethrough to hold the kicker pintle in its bearing.

5. A valve mechanism for motors comprising a valve seat, a rock shaft journalled adjacent said seat, a valve engaged on said seat, a pivoted kicker removably mounted and having a play connection with said valve for permitting an idle movement of the kicker relative to said valve preliminary to effecting a shift of said valve on its seat, an actuator movable by the rock shaft, a spring device connecting the actuator to the kicker and movable back and forth to opposite sides of the pivotal axis of said kicker and in a plane of movement disposed outwardly from said kicker, and means constituting stops arranged in the path of movement of said spring device for being engaged thereby for limiting the kicker movement and acting through the spring to hold said kicker against unauthorized displacement.

6. A valve mechanism for motors comprising a valve seat, a rock shaft journalled adjacent said seat, an open pivot bearing parallel with said rock shaft, a valve engaged on said seat, a kicker removably pivoted in said bearing, an actuator movable by the rock shaft, a coiled spring connecting the actuator to the kicker and movable back and forth to opposite sides of the pivotal axis of said pintle and in a plane of movement disposed outwardly from said kicker, spaced stops arranged in the path of movement of said spring for being engaged thereby for limiting the kicker movement, each of said stops overhanging said spring when engaged therewith for indirectly holding said kicker pintle against accidental displacement from its open pivot bearing.

7. A valve mechanism for suction-operated windshield cleaners comprising a valve, a kicker having connection therewith for moving the same from one to the other of two operative positions, spaced stops, an actuator movable from a moving part of the windshield cleaner motor, and a coil spring connecting the actuator to the kicker and extending between said stops for alternate engagement directly therewith for being limited thereby in its kicker-shifting movement whereby a cushioning effect is provided for such engagement.

8. A valve mechanism comprising a rock shaft, a valve pivoted on the shaft, a pivotally mounted kicker having connection with said valve, said kicker having one end extending away from said rock shaft, an actuator having a slot to receive a non-circular portion of the shaft to effect a keyed connection therewith whereby the actuator will rock with the shaft, said actuator being displaceable from the shaft in a direction away from the kicker, a coil spring connecting said end of the kicker to the actuator and movable back and forth across the pivotal axis of said kicker, said spring holding the actuator against radial displacement from the shaft, and spaced shoulders carried by the actuator for engaging adjacent parts of said kicker, preliminary to the functioning of said spring, to cooperate with said actuator in moving the spring to a kicker-actuating position.

9. A valve mechanism comprising a valve seat, a valve having a part engaged therewith, a pivot on which the valve is journalled, a member hung on the pivot and having support on said part of the valve and also on a rest independent of the valve at the opposite side of said pivot from said valve part, said rest supporting said member spaced from the valve except at said valve part, means for exerting a resilient pressure upon said member whereby said valve part will receive a uniform pressure thereby and will be maintained in firm seating engagement with said valve seat, and means for rocking the valve back and forth on its seat by and during movement of a moving part of the windshield cleaner motor.

10. A valve action for windshield cleaner motors comprising a valve seat, a rock shaft journalled thereby, a valve pivoted on the rock shaft and having a raised part engaging on said seat at one side of said shaft, the opposite side of said valve extending to the opposite side of the shaft unsupported, a plate hung on the shaft and bearing on said raised part of the valve, said plate extending to the opposite side of the shaft, means for supporting the plate at said opposite side of the shaft spaced from the underlying valve part, a spring engaged on the shaft and bearing on the plate to impart a uniform pressure on the raised part of the valve for resiliently seating said valve, an actuator secured to the shaft and holding the spring under compression, a pivoted kicker having connection with said unsupported opposite side of the valve for shifting the same, and a spring device connecting the kicker to the actuator and positionable by the latter for actuating said kicker.

11. A valve mechanism comprising a rock shaft, a valve seat, a valve mounted on said seat and pivoted on said shaft, a valve pressure spring disposed about said shaft and acting to seat the valve, a snap action comprising a kicker for imparting a quick movement to the valve, displaceably mounted to one side of said rock shaft and operably connected to said valve, a tension spring having one end connected to said kicker, and an actuator on said shaft displaceable radially therefrom, said actuator retaining the valve and the valve pressure spring against axial displacement from said rock shaft, the other end of said tension spring being anchored to the actuator for operating said kicker, said tension spring preventing radial displacement of said actuating means and the displacement of said kicker.

12. A valve mechanism comprising a rock shaft, a valve pivoted thereon, a kicker pivotally mounted to one side of the shaft and having a short arm extending toward the shaft and connected to said valve for moving the latter and a longer arm extending away from said rock shaft, an actuator on the shaft operable thereby, a spring connecting the outer end of the longer arm of the kicker to the actuator and movable therewith toward a dead center position with respect to the pivotal axis of the kicker, and spaced parts on the actuator for engaging and actuating the shorter arm of the kicker preliminary to the functioning of said spring whereby a relatively short movement of the actuator along with the shorter arm will effect the accelerated motion to the longer arm to effect a rapid shift of the spring across the pivotal axis of the kicker.

13. A valve mechanism comprising a shiftable valve, a pivotally mounted kicker having a short arm and a longer arm, said shorter arm being connected to the valve for shifting the same, movable actuator means, and a spring connecting the outer end of the longer arm to the actuator means and movable with the latter to a position approaching dead center with respect to the pivotal axis of the kicker, said actuator means having spaced shoulders for engaging and moving the shorter arm of the kicker, subsequent to an initial placement of the spring in said position by the actuator means and preliminary to the functioning of the spring, to effect an accelerated motion to the outer end of the longer arm for completing a quick shifting of the spring across the pivotal axis of the kicker.

HENRY HUEBER.